(12) United States Patent
Jun

(10) Patent No.: US 12,337,750 B2
(45) Date of Patent: Jun. 24, 2025

(54) INTELLIGENT NIGHT VISION SYSTEM AND DRIVING METHOD THEREOF

(71) Applicant: HYUNDAI MOBIS CO., LTD., Seoul (KR)

(72) Inventor: Young Geun Jun, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 63 days.

(21) Appl. No.: 18/346,771

(22) Filed: Jul. 3, 2023

(65) Prior Publication Data

US 2024/0181958 A1 Jun. 6, 2024

(30) Foreign Application Priority Data

Dec. 5, 2022 (KR) .................. 10-2022-0167298
Dec. 5, 2022 (KR) .................. 10-2022-0167514

(51) Int. Cl.
*B60Q 1/18* (2006.01)
*G06V 20/58* (2022.01)

(52) U.S. Cl.
CPC ............... *B60Q 1/18* (2013.01); *G06V 20/58* (2022.01); *B60Q 2300/05* (2013.01); *B60Q 2300/30* (2013.01); *B60Q 2300/42* (2013.01)

(58) Field of Classification Search
CPC .. B60Q 1/18; B60Q 2300/05; B60Q 2300/30; B60Q 2300/42; G06V 20/58
See application file for complete search history.

(56) References Cited

U.S. PATENT DOCUMENTS

2004/0114921 A1* 6/2004 Braun ................... G01C 11/025
396/661
2019/0359119 A1* 11/2019 Brouillard-Turgeon .....................
B60Q 1/0483
2021/0046862 A1* 2/2021 Wang ................... G06V 20/584

\* cited by examiner

*Primary Examiner* — Omeed Alizada
(74) *Attorney, Agent, or Firm* — DLA PIPER LLP US

(57) ABSTRACT

An intelligent night vision system for detecting an object in front of a vehicle driving at night, and selectively turning on only an infrared light source corresponding to an area in which the object is located or appropriately adjusting the brightness of the infrared light source to improve driving stability.

7 Claims, 8 Drawing Sheets

INTELLIGENT NIGHT VISION SYSTEM AND DRIVING METHOD THEREOF

CROSS-REFERENCE TO RELATED APPLICATIONS

This application claims priority under 35 U.S.C. § 119 to Korean Patent Application No. 10-2022-0167298, filed on Dec. 5, 2022 and No. 10-2022-0167514, filed on Dec. 5, 2022 in the Korean Intellectual Property Office, the disclosure of which is incorporated herein by reference in its entirety.

TECHNICAL FIELD

The present invention relates to an intelligent night vision system and a driving method thereof, and more particularly, to an intelligent night vision system for securing night visibility and a driving method thereof.

The present invention also relates to an intelligent night vision system for detecting an object in front of a vehicle that is driving, and selectively turning on only an infrared light source corresponding to an area in which the object is located or appropriately adjusting the brightness of the infrared light source to improve driving stability, and a driving method thereof.

BACKGROUND

A headlamp is a light illuminating a forward path along which a vehicle is traveling, and is required to have a brightness level sufficient to check a situation within a distance of about 100 meters in front of the vehicle at night.

The headlamp maintains a low beam pattern at normal times to prevent glare from being caused to a driver of an opposite vehicle traveling in an opposite direction or a driver of a preceding vehicle through a room mirror, a side mirror, or the like, and forms a high beam pattern as necessary when driving at a high speed or driving through a dark place with low ambient brightness, thereby assisting safe driving.

Recently, in most vehicles, an adaptive driving beam (ADB) headlamp is employed to automatically adjust the beam pattern described above.

Specifically, when a nearby vehicle (an opposite vehicle or a preceding vehicle) is detected during driving while a high beam pattern is formed, an angle of irradiation, brightness, width, length, etc. of light from the headlamp are automatically adjusted to allow for a host vehicle driver to secure a long visible distance without causing glare to drivers of nearby vehicles.

Such ADB headlamp systems use a plurality of light sources (e.g., light-emitting diode (LED) lamps), and may be classified as a dynamic type that forms a dark zone by changing an angle of a headlamp by an actuator when a nearby vehicle is detected and a matrix type that forms a dark zone by selectively turning off a corresponding light source when a nearby vehicle is detected, based on sensing information obtained by a camera and a technique for controlling turning on/off of a light source.

In such an ADB head lamp system, manufacturing costs increase when the number of light sources is increased to maximize the visibility of a host vehicle driver, and the size of turned-off areas increases, thus reducing marketability, when the number of light sources is reduced.

In addition, light may not be radiated to an area of a nearby vehicle requiring great care, thus affecting safe driving of the host vehicle driver.

To solve these problems, vehicles to which a night vision function is applied have recently been released.

The night vision function is a technique for displaying a front object on a screen using a plurality of infrared light sources (e.g., infrared LED lamps) to detect the front object.

In other words, the night vision function is a technique for detecting a front object (e.g., a front vehicle, pedestrian, or animal), which is not in the field of view of a driver that is secured by a headlamp and thus cannot be seen directly by the driver's eyes during night time driving, which relies on light from the headlamp, and displaying the front object on a display or outputting an alarm to support the driver in relation to a situation in front of the driver.

The night vision function is largely divided into a near-infrared projector method and a thermal imaging camera method using far-infrared rays. In the near-infrared projector method, light of an infrared band is radiated forward at night to sense light reflected and returned from a front object by a camera, and the returned light is displayed on a display of a vehicle to secure night visibility. In the thermal imaging camera method, a front object may be detected by installing a thermal imaging camera at the front of a vehicle to display the shape of a subject in different colors on a display according to absolute temperature of the subject.

The night vision function is mainly aimed to cope with situations that are difficult to cover by a visible light lamp (e.g., a headlamp) for securing night visibility. For example, the night vision function is to prevent a collision with an animal, a human or an object on the road that appears ahead suddenly, and prevent an accident with a nearby vehicle driving without turning on a headlamp at night.

The thermal imaging camera method is advantageous in terms of the detection of a living body, because an object is detected according to temperature, but is expensive to perform and is disadvantageous in that the resolution of an image displayed on a display is low. In contrast, the near-infrared projector method is relatively inexpensive to perform and is advantageous in terms of high resolution and thus has been generally used. However, an intensity of infrared rays to be radiated should be appropriate according to a distance within which object detection is to be performed, and it is difficult to detect the shape of an object when luminous intensity is less than or greater than the appropriate intensity.

The night vision function is an additional function other than an existing essential lamp function and thus power consumption increases when all of the plurality of infrared light sources are turned on. In addition, a front viewing angle that a driver can see is closely related to the speed of a vehicle, and as the speed of the vehicle increases, a viewing angle decreases but a required cognitive distance increases, and thus, visibility is limited by a specific situation and a distance due to a single luminous intensity and beam coverage.

SUMMARY

The present invention has been made in order to solve the problems described above, and is directed to providing an intelligent night vision system for securing sufficient visibility of the shape of a front object when the shape is identified through a display, as light radiated forward from a light-emitting diode (LED) of an infrared wavelength range is reflected/returned from the front object, and a driving method thereof.

The present invention is also directed to providing an intelligent night vision system for detecting an object in front of a vehicle, and turning on an infrared light source corresponding to an area of the detected object or controlling an operating current of the corresponding infrared light source, thereby maximizing visibility to improve driving stability while efficiently reducing power consumption, and a driving method thereof.

In one general aspect, an intelligent night vision system for a vehicle, includes a lamp array part including a plurality of light sources provided independently from each other, and a lamp driving controller configured to control the lamp array part on the basis of driving information of the vehicle, wherein the plurality of light sources radiate light of an infrared wavelength range, and the lamp driving controller controls luminous intensities and irradiation ranges of the plurality of light sources, based on the driving information.

The lamp driving controller may control an entire beam pattern, which is a combination of pieces of light radiated from the lamp array part, to be symmetrical with respect to a center of the entire beam pattern.

The lamp driving controller may control the lamp array part to radiate light to a first area at a vertical directional angle ranging from a 1-1 angle to a 1-2 angle, the first area being included in a certain angle range with respect to a centerline in a horizontal direction among areas to which light is radiated from the lamp array part, and control the lamp array part to radiate light to a second area at a vertical directional angle less than or equal to a second angle, the second region being a remaining area excluding the first area among the areas to which light is radiated from the lamp array part, and the second angle is greater than the 1-1 angle and less than the 1-2 angle.

The lamp driving controller may control the lamp array part to radiate light to a first area at a vertical directional angle ranging from a 1-1 angle to a 1-2 angle, the first area being included in a certain angle range with respect to a centerline in a horizontal direction among areas to which light is radiated from the lamp array part, and control the lamp array part to radiate light to a 2-1 region at a vertical directional angle less than or equal to a second angle and radiate light to a 2-2 region at a vertical directional angle less than or equal to the 1-2 angle, the 2-1 region being a low end region of the other area, excluding the first area, with respect to a centerline in a horizontal direction among the areas to which light is radiated from the lamp array part, and the 2-2 region being an upper end region of the other area, and the 2-1 angle is greater than the 1-1 angle and less than the 1-2 angle.

The lamp driving controller may obtain a sensing distance from the driving information, and control the luminous intensity to be equal to a multiple of a square of the sensing distance.

The lamp driving controller may control two or more light sources among the plurality of light sources to be turned on or off, in which units controlled to be turned on or off are the same as units of areas to which light is radiated forward.

The lamp driving controller may obtain information about the speed of the vehicle from the driving information, and control the lamp array part to maintain or reduce the number of light sources to be turned on or off as the speed of the vehicle increases and to first turn off a light source radiating light to an outermost side in horizontal direction.

The lamp driving controller may control the optical module to increase luminous intensity of a light source radiating light toward a center in a horizontal direction among the plurality of light sources.

In another general aspect, an intelligent night vision system includes an object detection part configured to detect a front object, a lamp array part including a plurality of infrared light sources arranged in a matrix to form a beam pattern, an object analysis part configured to analyze information about a movement of the detected object, based on information detected by the object detection part, and a lamp driving controller configured to individually control the plurality of infrared light sources of the lamp array part, based on the information analyzed by the object analysis part.

The lamp array part may include an a-region including infrared light sources arranged in predetermined regions to the left and right of a central infrared light source disposed at a center in a horizontal direction, a b-region including infrared light sources arranged in predetermined regions corresponding to a left end and a right end of the a-region, and a c-region including infrared light sources arranged in predetermined regions corresponding to a left end and a right end of the b-region.

In the lamp array part, an arrangement density of the infrared light sources included in the a-region may be higher than that of the infrared light sources included in the b-region, and an arrangement density of the infrared light sources included in the b-region may be higher than that of the infrared light sources included in the c-region.

In the lamp array part, the infrared light sources included in the a-region may be arranged to form at least n layers in a vertical direction, the infrared light sources included in the b-region may be arranged to form at least m layers in the vertical direction, and the infrared light sources included in the c-region may be arranged to form at least o layers in the vertical direction, in which $n > m > o$ and $o >= 1$.

The lamp array part may be arranged to match a directional angle of the central infrared light source to 0 degrees, and increase absolute values of directional angles of the other infrared light sources, excluding the central infrared light source, in directions toward outermost angles in the horizontal direction.

The object analysis part may track a movement of the detected object on the basis of the detected information to analyze a moving direction, a moving speed, and current location information of the detected object, and predict next location information on the basis of the moving direction, the moving speed, and the current location information.

The lamp driving controller may supply an operating current to an infrared light source matching the current location information and an infrared light source matching the predicted next location information, based on the analyzed moving direction, moving speed, and current location information.

The lamp driving controller may supply a current, which is in a predetermined allowable current range, as an operating current to the infrared light source matching the current location information, and supply a current, which is equal to or lower than the operating current supplied, as an operating current to the infrared light source matching the current location information to the infrared light source matching the predicted next location information.

In another general aspect, there is provided a driving method of an intelligent night vision system in which operations are performed by an operation processing device, the driving method including an object detection operation of detecting a front object, an object analysis operation of analyzing information about a movement of the detected object, based on information detected in the object detection operation, and a lamp driving control operation of controlling a driving state of a lamp array part, based on the information analyzed in the object analysis operation, wherein the lamp array part includes a plurality of infrared light sources arranged in a matrix to form a beam pattern.

The lamp array part may include an a-region including infrared light sources arranged in predetermined regions to the left and right of a central infrared light source disposed at a center in a horizontal direction, a b-region including infrared light sources arranged in predetermined regions corresponding to a left end and a right end of the a-region, and a c-region including infrared light sources arranged in predetermined regions corresponding to a left end and a right end of the b-region.

In the lamp array part, an arrangement density of the infrared light sources included in the a-region may be higher than that of the infrared light sources included in the b-region, and an arrangement density of the infrared light sources included in the b-region may be higher than that of the infrared light sources included in the c-region.

In the lamp array part, the infrared light sources included in the a-region may be arranged to form at least n layers in a vertical direction, the infrared light sources included in the b-region may be arranged to form at least m layers in the vertical direction, and the infrared light sources included in the c-region may be arranged to form at least o layers in the vertical direction, in which $n>m>o$ and $o>=1$.

The lamp array part may be arranged to match a directional angle of the central infrared light source to 0 degrees, and increase absolute values of directional angles of the other infrared light sources in directions toward outermost angles in the horizontal direction.

The object analysis operation may include tracking a movement of the detected object to analyze a moving direction, a moving speed, and current location information of the detected object, based on the detected information in the object detection operation, and predicting next location information, based on the analyzed moving direction, moving speed, and current location information.

The lamp driving control operation may include supplying an operating current to an infrared light sources matching the current location information and an infrared light source matching the predicted next location information, based on the information analyzed in the object analysis operation, in which a current, which is in a predetermined allowable current range, may be supplied as an operating current to the infrared light source matching the current position information, and a current less than or equal to the operating current supplied to the infrared light source matching the current position information may be supplied as an operating current to the infrared light source matching the predicted next position information.

After the operating currents are supplied to the matched infrared light sources, the lamp driving control operation may include maintaining the supply of the operating currents for a certain time.

DETAILED DESCRIPTION OF EMBODIMENTS

Figure 1:
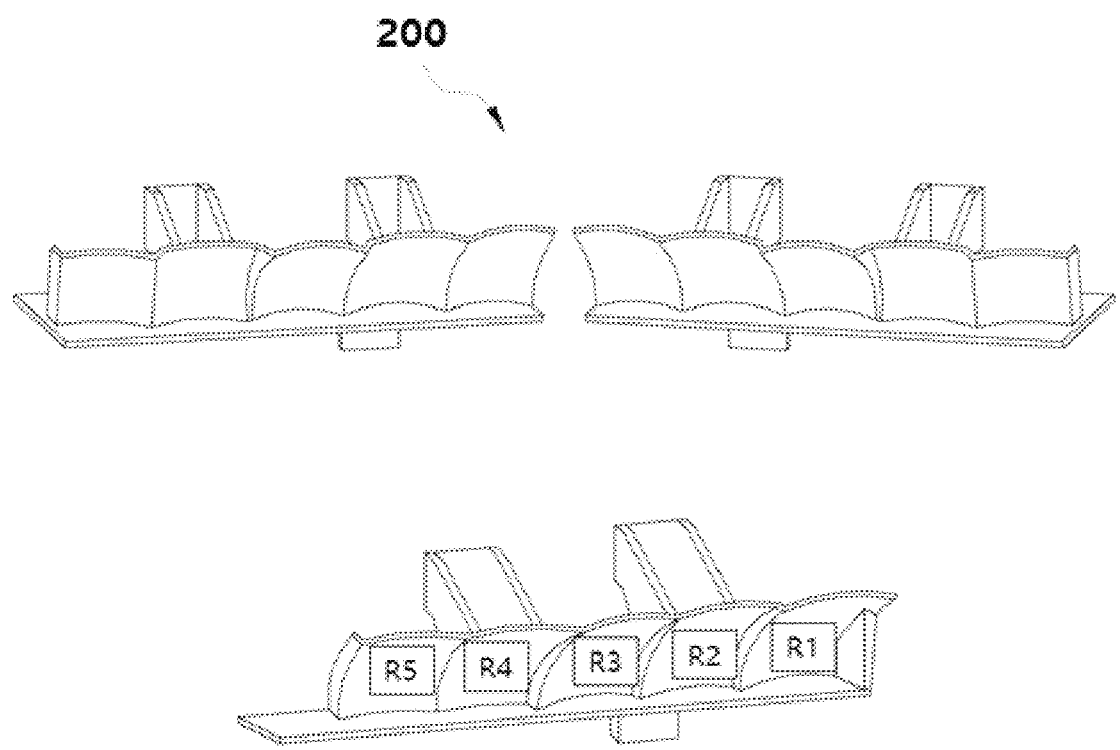
FIG. 1 is a diagram illustrating a lamp array part applied to an intelligent night vision system and a driving method thereof according to an embodiment of the present invention.

The objects, features, and advantages of the present invention described above will become more apparent from the following embodiments in conjunction with the accompanying drawings. Specific structures and functions to be described below are provided only as examples for the purpose of describing embodiments according to the present invention, and these embodiments may be implemented in various forms and the present invention should not be understood as being limited to embodiments set forth herein or described in the present application. Various modifications may be made in the embodiments according to the present invention and these embodiments may be implemented in various forms, and thus, certain embodiments are illustrated in the drawings and described in detail in the present specification or application. However, it should be understood that the present invention is not limited to particular embodiments and includes all modifications, equivalents, and alternatives falling within the idea and scope of the present invention. Terms such as first, second, etc. may be used to describe various components but the components should not be limited by the terms. These terms are only used to distinguish one component from another component. For example, a first component could be termed a second component without departing from the scope of the present invention, and similarly, a second component could be termed a first component. When a component is referred to as being "coupled to" or "connected" to another component, it should be understood that the component may be directly coupled to or connected to the other component but another component may be interposed therebetween. In contrast, when a component is referred to as being "directly coupled" or "directly connected" to another component, it should be understood that no component is interposed therebetween. Other expressions that describe a relationship between components, i.e., "between", "immediately between", "adjacent to", "immediately adjacent to", etc. should be understood similarly. The terms used herein are only used to describe certain embodiments and are not intended to limit the present invention. As used herein, the singular expressions are intended to include plural forms as well, unless the context clearly dictates otherwise. It should be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof. Unless defined otherwise, all terms used herein, including technical or scientific terms, have the same meaning as commonly understood by those of ordinary skill in the art to which the present invention pertains. Terms such as those defined in a commonly used dictionary should be interpreted as having meanings consistent with meanings in the context of related technologies and should not be interpreted as ideal or excessively formal meanings unless explicitly defined herein. Hereinafter, the present invention will be described in detail by describing embodiments thereof with reference to the accompanying drawings. The same reference numerals shown in each drawing represent the same elements.

In addition, a system is a set of components, including devices, instruments, means, etc., which are organized and regularly interact with each other to perform desired functions.

An intelligent night vision system according to an embodiment of the present invention is an intelligent night vision system for a vehicle, and includes a lamp array part 200 and a lamp driving controller 400.

In this case, the intelligent night vision system according to the embodiment of the present invention may be applied to a vehicle including a sensor part for obtaining information about at least one of a vehicle speed, a road condition, or a driving situation. The lamp array part 200 includes a plurality of light sources.

The lamp driving controller 400 controls the lamp array part 200 on the basis of driving information of a vehicle.

Specifically, the plurality of light sources may be independently provided to radiate light in an infrared wavelength range. As shown in FIG. 1, the lamp array part 200 may include a plurality of reflective surfaces R1 to R5, and each of the reflective surfaces R1 to R5 may correspond to one of the plurality of light sources, and an area to which light is radiated from each of the plurality of light sources may be divided into two or more regions.

More specifically, the lamp driving controller 400 may change a current of a light source to change luminous intensity and control turning on or off of a light, based on driving information. The lamp driving controller 400 may control turning on or off of more than two light sources, and units in which turning on or off is controlled may be the same as units of areas to which light is radiated forward.

For example, the lamp array part 200 may include five or more light sources on each of left and right sides thereof. Specifically, each of the left and right sides of the lamp array part 200 may be provided with five or more reflective surfaces R1 to R5 each matching one of the five or more light sources.

Preferably, a left optical module LH and a right optical module RH may have the same structure but be asymmetric to each other.

A conventional visible light lamp has a light distribution pattern of covering upper and lower end regions by a high beam and a low beam with respect to a horizontal center line instead of irradiated light to an entire area.

A conventional infrared lamp has a light distribution pattern of radiating light in an elliptical form. With respect to the horizontal center line, a lower end region of +10 degrees is an area covered with a low beam but is not an area to which light is radiated to respond to a sudden appearance of a human or an animal in the field of view of a driver, i.e., for a main purpose of an infrared ray night vision system.

Figure 2:
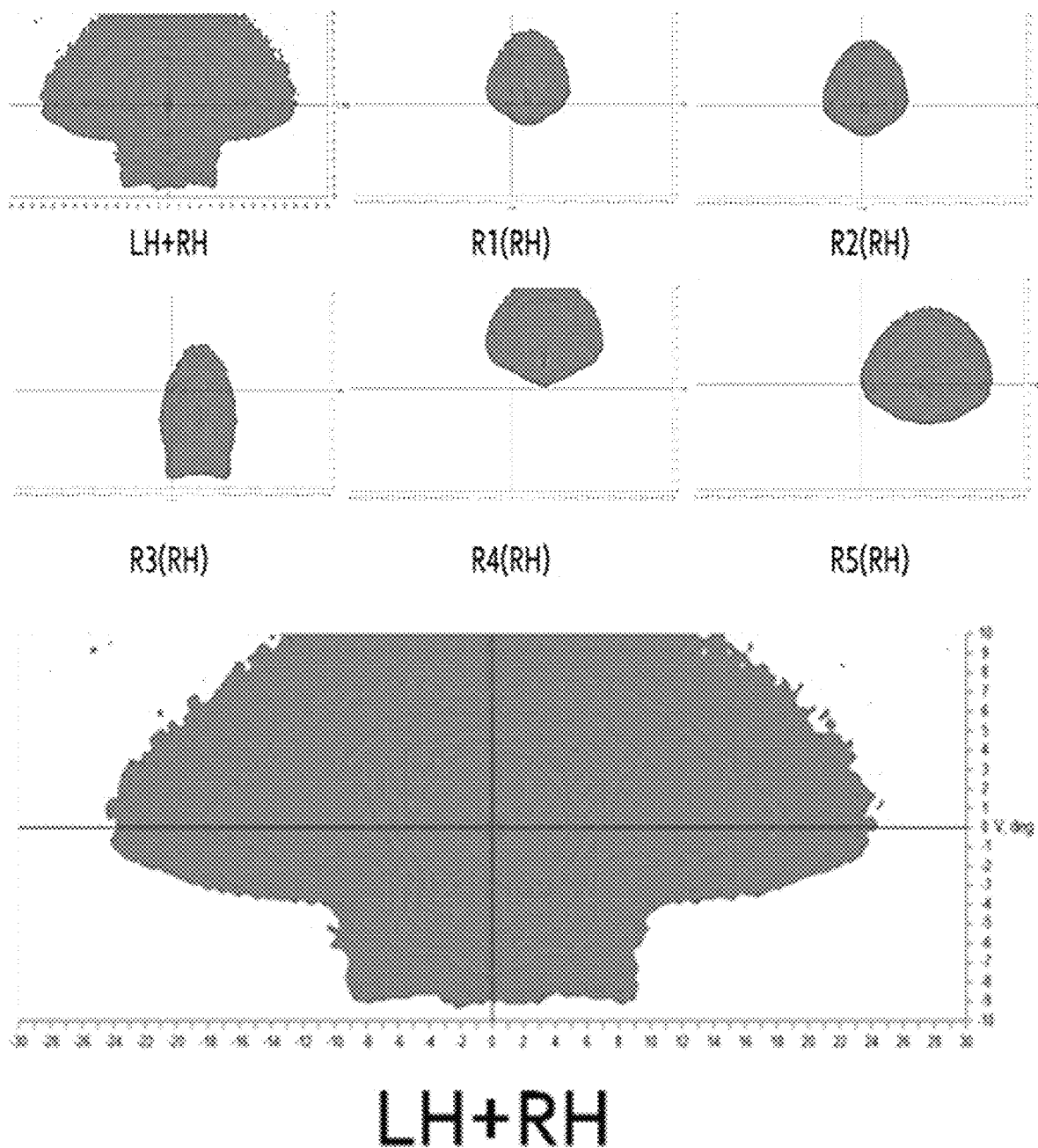
FIG. 2 is a diagram illustrating a beam pattern obtained from an intelligent night vision system according to an embodiment of the present invention.

Therefore, beam patterns according to the present invention may be symmetrical to each other with respect to a vertical line, and an entire beam pattern that is a combination of beam patterns of two opposite optical modules may be the same as an LH+RH pattern as shown in FIG. 2. It can be seen that beam patterns are symmetrical to each other with respect to the center of the entire LH+RH pattern.

Specifically, the lamp driving controller 400 may control the lamp array part 200 to radiate light at a vertical directional angle ranging from a 1-1 angle to a 1-2 angle to a first area of −10 degrees to +10 degrees in the horizontal direction among areas to which light is radiated from the lamp array part 200. More specifically, a range of the vertical directional angle may be −8 degrees to +10 degrees.

In addition, a second area, which is a remaining area excluding the first region, may be an area of −10 degrees or less and +10 degrees or more, and more specifically, an area of −25 degrees to −10 degrees and 10 degrees to 25 degrees. The lamp driving controller 400 may control light to be radiated downward at a vertical directional angle less than or equal to a second angle with a centerline of a horizontal axis, and the second angle may be −4 degrees. More specifically, the vertical directional angle may be controlled to be gradually changed from −4 degrees to 0 degrees.

As another example, the lamp drive controller 400 may control the lamp array part 200 to radiate light to a 2-1 region, which is a low end region of the second area with respect to the centerline of the horizontal axis, at a vertical directional angle less than or equal to the second angle. Specifically, the second angle may be −4 degrees, and the lamp array part 200 may be controlled to gradually change the vertical direction angle from −4 degrees to 0 degrees. Light may be radiated to a 2-2 region, which is an upper end region of the second area with respect to the centerline of the horizontal axis, at a vertical directional angle less than or equal to the 1-2 angle. In this case, the vertical directional angle may decrease from −15 degrees to −10 degrees and 10 degrees to 15 degrees with respect to the centerline of the horizontal axis, and converge from −25 degrees and +25 degrees to 0 degrees.

Due to this pattern, it is more efficient than before, because the number of light sources can be reduced or light can be concentrated on more necessary areas.

Table 1 below shows vertical irradiation angles required for a left position, a right position, and the height of a subject according to the present invention. Table 2 below shows horizontal irradiation angles required for a left position and a right position according to the present invention.

TABLE 1

| Height (m) of subject | Position (m) in left-right direction | | | | | | |
|---|---|---|---|---|---|---|---|
| | −30 | −20 | −10 | 0 | 10 | 20 | 30 |
| 0 | −1.27 | −1.79 | −2.83 | −4 | −2.83 | −1.79 | −1.27 |
| 0.5 | −0.36 | −0.51 | −0.81 | −1.15 | −0.81 | −0.51 | −0.36 |
| 1 | 0.54 | 0.77 | 1.22 | 1.72 | 1.22 | 0.77 | 0.54 |
| 2 | 2.35 | 3.33 | 5.25 | 7.41 | 5.25 | 3.33 | 2.35 |

TABLE 2

| | Headway distance | | | | | | |
|---|---|---|---|---|---|---|---|
| | −30 | −20 | −10 | 0 | 10 | 20 | 30 |
| 30 m | −45 | −33.69 | −18.43 | 0 | 18.43 | 33.49 | 45 |

Before describing Tables 1 and 2 above, areas on the road for which night vision is required may be a total of six lanes, i.e., two opposite lanes and four preceding lanes or three opposite lanes and three preceding lanes, and the six lanes correspond to an optical width of about 20 m. Considering a width of each lane, a narrower viewing angle is required as a sensing distance increases, and a wider viewing angle is required as the sensing distance decreases.

In this case, a required sensing distance is about 30 to 100 m ahead. Even during driving at high speed, a subject can be detected and a reaction such as braking or avoidance can be made at a distance of about 100 m ahead, and visibility can be secured with a low beam at a distance of 30 m or less.

Specifically, considering a lamp mounting height of 700 mm and a width between left and right lamps, i.e., 1400 mm, which are general criteria, vertical irradiation angles required for the left and right positions and the height of the subject at a distance 10 m ahead shown in Table 1 increase as a sensing distance decreases, and thus, it is sufficient to check an angle at each position at a distance of about 10 m ahead, which is a shortest distance seen at a driver's seat. As shown in FIG. 1, a minimum radiation angle of −4 degrees in a downward direction and a maximum radiation angle of about 7.4 degrees in an upward direction are required at a distance of 10 m ahead in the vertical direction. Therefore, light may be radiated to a first area of −10 degrees to +10 degrees in the horizontal direction at a vertical directional angle of −8 degrees to +10 degrees.

On the other hand, it is not necessary to radiate light to all areas of left and right vertical directional angles. As shown in Table 2, a vertical radiation angle of about −18.4 degrees is required to cover an optical width of 20 m (10 m in a left direction and 10 m in a right direction) at a distance of 30 m ahead, a vertical-direction angle required at a corresponding position is only −1.27 degrees, and a vertical radiation angle required at a position corresponding to left and right directional angles of about 10 degrees is −1.32 degrees. Thus, light may be controlled to be radiated at a vertical directional angle of −4 degrees or less to a second area, which is an outer region of −10 degrees and 10 degrees.

In addition, luminous intensity when all light sources are turned on is not required to be high at an outer region of −10 degrees to +10 degrees, because a vertical directional angle of −10 degrees to +10 degrees satisfies a required optical width of 20 m at an area at a distance of 50 to 60 m ahead. Accordingly, visibility of night vision can be sufficiently secured with a beam pattern as shown in FIG. 2.

The above-described beam pattern may be effective particularly when the number of LEDs is limited and the LEDs are configured cost-effectively. The above-described beam pattern may be more effective, when the size of a reflective surface is limited to a certain width or less, and thus, a degree of freedom of the shape of an individual pattern is limited and it is easy to form an oval shape in which a center part is bright and brightness gradually decreases toward outer sides. To this end, when five individual pattern irradiation areas as shown in FIG. 2 are provided, it is easy to satisfy a pattern required when all the light sources are turned on.

In general, in order to selectively radiate light to a desired area with a limited number of light sources, light of an intensity appropriate to achieve a resolution sufficient for detecting a front subject is required, and the intensity of the light is related to the sensitivity of an infrared camera. That is, a certain level or more of light should enter a camera sensor to secure night visibility and thus a required illuminance according to a sensing distance may be the same level.

Therefore, in order to secure the same illuminance regardless of a distance, a luminous intensity corresponding to a multiple of a square of a sensing distance is required, and thus, the lamp driving controller 400 may obtain information about a sensing distance from driving information and control the lamp array part 200 according to the multiple of the square of the sensing distance to control luminous intensity.

Figure 3:
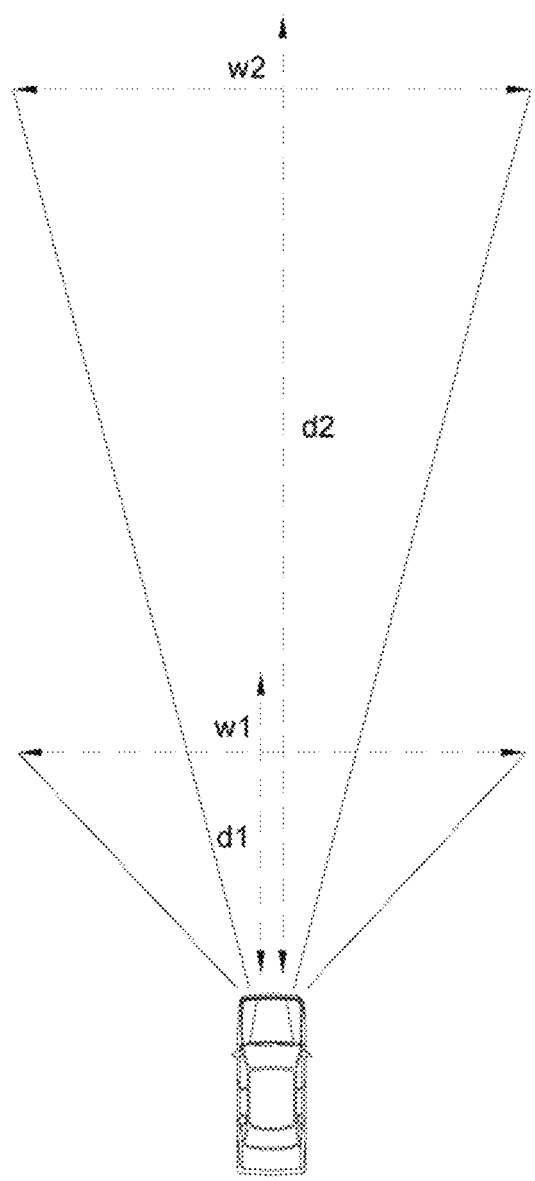
FIG. 3 is a diagram illustrating a beam coverage and luminous intensity required in an intelligent night vision system relative to a distance, according to an embodiment of the present invention.

FIG. 3 is a diagram illustrating a beam coverage and a luminous intensity required at each distance according to the present invention. Table 3 shows a luminous intensity and an illuminance required at each distance according to the present invention.

TABLE 3

| | | Required luminous intensity (w/sr) | | | | | | | |
|---|---|---|---|---|---|---|---|---|---|
| | | 23.4 | 41.6 | 65 | 93.6 | 127.4 | 166.4 | 210.6 | 260 |
| | | Required illuminance (w/m²) | | | | | | | |
| | | 0.026 | | | | | | | |
| | | Headway distance (m) | | | | | | | |
| | | 30 | 40 | 50 | 60 | 70 | 80 | 90 | 100 |
| Distance- | 1 | 0.52 | 0.70 | 0.87 | 1.05 | 1.22 | 1.40 | 1.57 | 1.75 |
| specific | 2 | 1.05 | 1.40 | 1.75 | 2.10 | 2.44 | 2.79 | 3.14 | 3.49 |
| coverage | 3 | 1.57 | 2.10 | 2.62 | 3.14 | 3.67 | 4.19 | 4.72 | 5.24 |
| angle | 4 | 2.10 | 2.80 | 3.50 | 4.20 | 4.89 | 5.59 | 6.29 | 6.99 |
| (unilat- | 5 | 2.62 | 3.50 | 4.37 | 5.25 | 6.12 | 7.00 | 7.87 | 8.75 |
| eral) | 6 | 3.15 | 4.20 | 5.26 | 6.31 | 7.36 | 8.41 | 9.46 | 10.51 |
| | 7 | 3.68 | 4.91 | 6.14 | 7.37 | 8.59 | 9.82 | 11.05 | 12.28 |
| | 8 | 4.22 | 5.62 | 7.03 | 8.43 | 9.84 | 11.24 | 12.65 | 14.05 |
| | 9 | 4.75 | 6.34 | 7.92 | 9.50 | 11.09 | 12.67 | 14.25 | 15.84 |
| | 10 | 5.29 | 7.05 | 8.82 | 10.58 | 12.34 | 14.11 | 15.87 | 17.63 |
| | 11 | 5.83 | 7.78 | 9.72 | 11.66 | 13.61 | 15.55 | 17.49 | 19.44 |
| | 12 | 6.38 | 8.50 | 10.63 | 12.75 | 14.88 | 17.00 | 19.13 | 21.26 |
| | 13 | 6.93 | 9.23 | 11.54 | 13.85 | 16.16 | 18.47 | 20.78 | 23.09 |
| | 14 | 7.48 | 9.97 | 12.47 | 14.96 | 17.45 | 19.95 | 22.44 | 24.93 |
| | 15 | 8.04 | 10.72 | 13.40 | 16.08 | 18.76 | 21.44 | 24.12 | 26.79 |
| | 16 | 8.60 | 11.47 | 14.34 | 17.20 | 20.07 | 22.94 | 25.81 | 28.67 |
| | 17 | 9.17 | 12.23 | 15.29 | 18.34 | 21.40 | 24.46 | 27.52 | 30.57 |
| | 18 | 9.75 | 13.00 | 16.25 | 19.50 | 22.74 | 25.99 | 29.24 | 32.49 |
| | 19 | 10.33 | 13.77 | 17.22 | 20.66 | 24.10 | 27.55 | 30.99 | 34.43 |
| | 20 | 10.92 | 14.56 | 18.20 | 21.84 | 25.48 | 29.12 | 32.76 | 36.40 |
| | 21 | 11.52 | 15.35 | 19.19 | 23.03 | 26.87 | 30.71 | 34.55 | 38.39 |
| | 22 | 12.12 | 16.16 | 20.20 | 24.24 | 28.28 | 32.32 | 36.36 | 40.40 |
| | 23 | 12.73 | 16.98 | 21.22 | 25.47 | 29.71 | 33.96 | 38.20 | 42.45 |
| | 24 | 13.36 | 17.81 | 22.26 | 26.71 | 31.17 | 35.62 | 40.07 | 44.52 |
| | 25 | 13.99 | 18.65 | 23.32 | 27.98 | 32.64 | 37.30 | 41.97 | 46.63 |

In FIG. 3, when d1=30 m, a coverage angle required for an optical width w1 of 20 m may be ±19 degrees. Table 3 shows that required luminous intensity is 23.4 w/sr.

In FIG. 3, when d2=100 m, a coverage angle required for an optical width w2 of 20 m may be ±6 degrees. Table 3 shows that required luminous intensity is 260 w/sr.

However, the required illuminances and luminous intensities shown in Table 3 are not absolute criteria but are only examples of numerical values in a particular design provided to help the understanding of the present invention.

Figure 4:
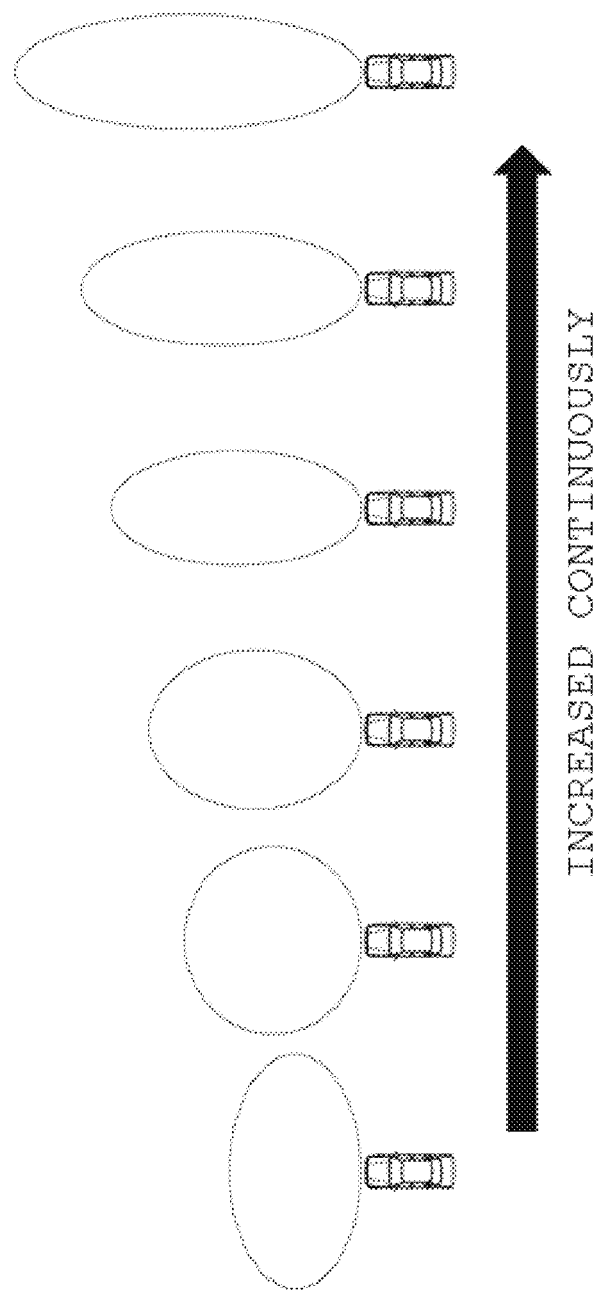
FIG. 4 is a diagram illustrating a luminous intensity and a directional angle in an intelligent night vision system relative to the speed of a vehicle according to an embodiment of the present invention.

FIG. 4 is a diagram illustrating luminous intensity and a directional angle relative to the speed of a vehicle according to the present invention.

As shown in FIG. 4, luminous intensity and an irradiation range may vary depending on the speed of the vehicle. Specifically, as the speed of the vehicle increases, the field of view of a driver decreases and a distance to be checked for safety increases. Accordingly, when infrared light of a certain luminous intensity is radiated, there is no problem with detecting a subject located at a distance corresponding to the luminous intensity but when the subject is located at a distance shorter or longer than the corresponding distance, the luminous intensity of the light is extremely low or high, and thus, the subject is difficult to detect.

Therefore, the lamp driving controller 400 may obtain information about the speed of the vehicle from driving information and control the lamp array part 200 to maintain or decrease the number of light sources to be turned on or off as the speed of the vehicle increases.

In addition, the lamp driving controller 400 may independently control a plurality of light sources such that the luminous intensity of a light source radiating light toward a center in a horizontal direction among the plurality of light sources is high.

Preferably, the lamp driving controller 400 may control a current value not to exceed maximum power consumption allowed for a night optical system for a moving object.

Accordingly, the lamp driving controller 400 may control the lamp array part 200 such that as the speed of the vehicle increases, a luminous intensity and a current value increase and a directional angle and the number of light sources to be turned on decrease. On the other hand, the lamp driving controller 400 may control the lamp array part 200 such that as the speed of the vehicle decreases, the luminous intensity and the current value decrease and the directional angle and the number of light sources to be turned on increase.

Accordingly, night visibility can be efficiently secured by independently controlling the light sources according to a driving environment.

An intelligent night vision system and a driving method thereof according to another embodiment of the present invention are techniques for compensating for other disadvantages of the ADB headlamp and the night vision function.

Briefly, an object (a vehicle, an animal or a human) appearing in front of a vehicle can be detected through an infrared sensor (a camera or the like), and an infrared light source (an infrared LED or the like) corresponding to an area of the detected object can be selectively turned on. Thus, even when a dark zone is formed on an object detection area due to the ADB headlamp, an infrared ray can be radiated to the dark zone to secure a driver's visibility for an entire area in front of the vehicle without a blank area.

In this case, in order to solve a problem with power consumption, which is a disadvantage of the night vision function, only the infrared light source corresponding to the area of the detected object can be selectively turned on when spare power cannot be operated on the basis of allowable power consumption, and not only the infrared light source corresponding to the area of the detected object but also infrared light sources corresponding to an surrounding area can be turned on for safety when the spare power can be operated.

In addition, a current can be converted to radiate light of an appropriate luminous intensity on the basis of information about a distance to the detected object, and thus, the above-described disadvantages of the ADB headlamp and the night vision function can be efficiently supplemented, accidents can be prevented from occurring, and visibility can be secured, thereby improving driving safety of a driver.

Figure 5:
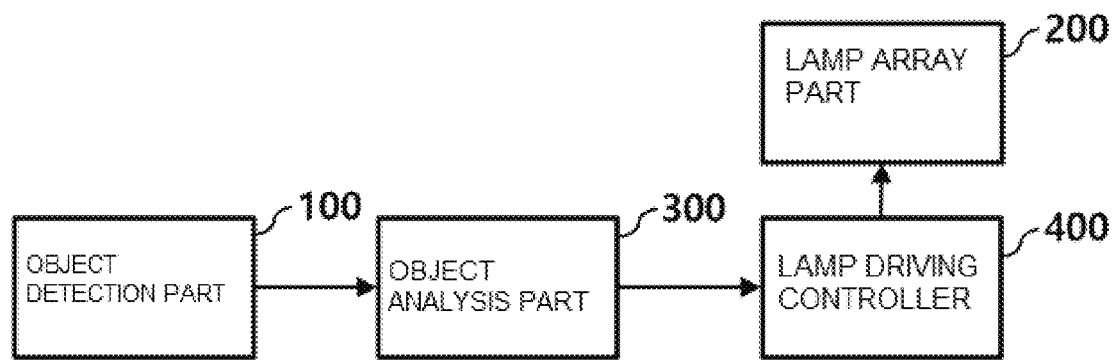
FIG. 5 is a diagram illustrating a configuration of an intelligent night vision system according to an embodiment of the present invention.

An intelligent night vision system according to an embodiment of the present invention includes an object detection part 100, a lamp array part 200, an object analysis part 300, and a lamp driving controller 400 as shown in FIG. 5. Operations of these components may be performed through an operation processing device such as an electronic control unit (ECU) including a computer that performs data transmission and reception through a communication channel in a vehicle.

These components will be described in detail below.

The object detection part 100 may detect an object (a vehicle, an animal, a human, or the like) in front of a vehicle that is driving.

To this end, the object detection part 100 detects an object by sensing light returned after being reflected from the object, which is within a detection distance, through a sensor (a camera or the like) mounted on the front of the vehicle and capable of detecting an infrared wavelength range, when light is radiated forward.

Detecting an object in front of a vehicle by a sensor capable of detecting an infrared wavelength range as described above is well-known technology and thus a detailed description thereof is omitted here.

However, the object detection part 100 may continuously detect an object in front of the vehicle that is driving at predetermined time intervals to continuously provide detection information so that the object analysis part 300 may estimate a movement of the object in front of the vehicle.

It is preferable that the lamp array part 200 includes technical features to be described below, as well as the technical features described above.

Specifically, in the lamp array part 200 may be configured to form a beam pattern by arranging a plurality of infrared light sources (infrared LEDs or the like) in a matrix, and be mounted on the front of the vehicle to radiate infrared rays ahead of the vehicle.

Figure 6:
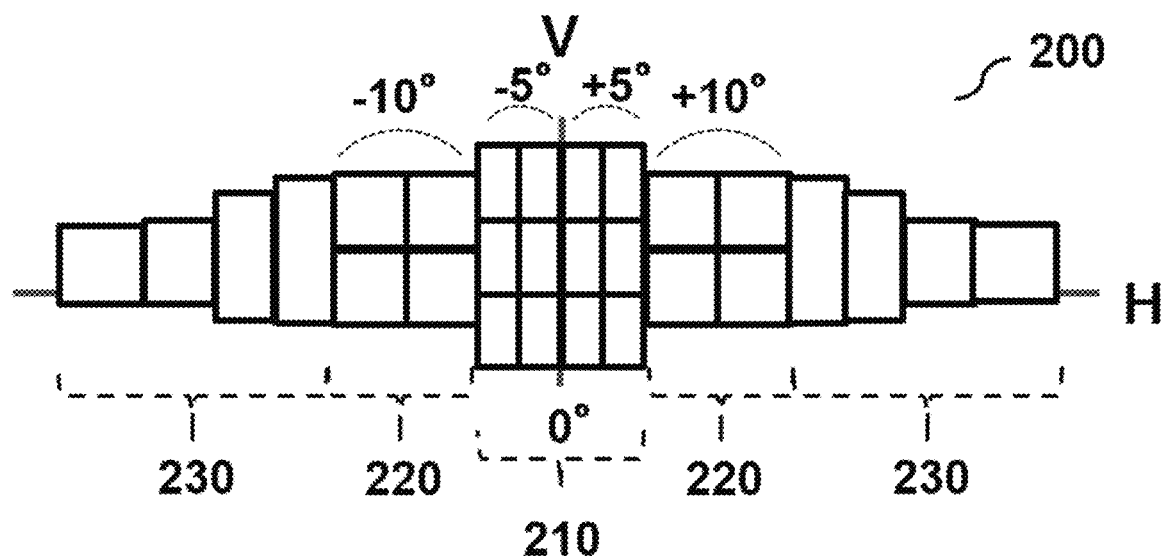
FIG. 6 is a diagram illustrating an arrangement of a lamp array part of an intelligent night vision system and a driving method thereof according to an embodiment of the present invention.

Specifically, as shown in FIG. 6, the plurality of infrared light sources of the lamp array part 200 may be arranged in an a-region 210, a b-region 220, and a c-region 230 divided in the horizontal direction from an area in front of the vehicle that affects the driving of the vehicle.

Infrared light sources arranged in predetermined regions to the left and right of a central infrared light source arranged at the center in the horizontal direction may be included in the a-region 210, and infrared light sources arranged in predetermined regions corresponding to a left end and a right end of the a-region 210 may be included in the b-region 220.

Infrared light sources arranged in predetermined regions corresponding to a left end and a right end of the b-region 220 may be included in the c-region 230.

Here, the predetermined regions may be set by dividing a width of a front area, which affects the driving of the vehicle and may vary according to the type of the vehicle, into several parts in the horizontal direction, and preferably, by dividing a width of about 20 m, which is sufficient to cover six lanes, into several parts in the horizontal direction, but the width of the front area is not limited to 20 m.

It can be seen that animals or humans were initially detected on outer regions (10 degrees of more) of the road and moved inward in the horizontal direction, when objects that are likely to appear on the road on which the vehicle is driving and thus are likely to be detected by the object detection part 100 were limited to vehicles, animals, and humans, and statistics of movement patterns thereof were analyzed through an experiment.

In addition, it can be seen that vehicles were initially found in a small detection region of an area close to the center of the road (10 degrees or less), a rate of change in a horizontal angle was low (close to 0 degrees), but a rate of change in a vertical angle increased sharply, i.e., the detection region increased sharply.

In addition, it can be seen that a maximum height at which objects appeared was 2 m, and thus, it is desirable to set a vertical angle at the center of an effective field of view (FOV) of the lamp array part 200 to −7 to +10 degrees and a horizontal angle at the center of the FOV to about −25 to +25 degrees.

That is, as shown in FIG. 6, it is desirable to arrange infrared light sources such that a directional angle of a central infrared light source matches 0 degrees, and absolute values of directional angles of the other infrared light sources increase in directions toward outermost angles in the horizontal direction.

Accordingly, an outer region of the lamp array part 200 need not be divided into segments, because a risk of collision with a host vehicle may occur when the host vehicle moves inward in the horizontal direction, whereas a central region of the lamp array part 200 needs to be divided into segments, because a risk of collision of a region adjacent to the central region is high and a small initial detection region increases sharply.

In consideration of this point, it is desirable to arrange the lamp array part 200 such that a density of the infrared light sources included in the a-region 210 is higher than that of the infrared light sources included in the b-region 220.

In addition, it is desirable to arrange the lamp array part 200 such that a density of the infrared light sources included in the b-region 220 is higher than that of the infrared light sources included in the c-region 230.

In this case, in the lamp array part 200, the infrared light sources are not simply densely arranged, but the infrared light sources included in the a-region 210 may form at least n layers (rows), the infrared light sources included in the b-region 220 may form at least n layers (rows), and the infrared light sources included in the c-region 230 may form at least o layers (rows).

Here, preferably, n>m>o, and o>=1.

Accordingly, a risk of collision in the c-region 230, which is an outer angle region (10 degrees or more) in which generally, animals or humans appear, is less than that in a region adjacent to the center (10 degrees or less), and thus, the c-region 230 may be divided into a relatively small number of segments to form one row.

However, in the a-region 210 and the b-region 220, which are adjacent to the center and in which generally, vehicles appear, the size of a detection area is small when an object is initially detected and increases sharply as time goes by, and thus, regions adjacent to the center may be divided into a relatively large number of segments to form multiple rows.

The object analysis part 300 may analyze information about a movement of the detected object on the basis of the detection information provided by the object recognition unit 100.

As described above, the object detection part 100 detects an object in front of the vehicle that is driving at predetermined time intervals, and transmits detection information to the object analysis part 300.

Specifically, as a first night vision function, the object analysis part 300 converts the detection information transmitted from the object detection part 100 into image data and displays the image data on a display part of the vehicle to notify a driver about a situation in front of the vehicle during driving at night.

At the same time, a movement of the detected object may be tracked on the basis of image data that is continuously converted in a time-series order, and not only current location information of the detected object but also a moving direction and speed of the object may be calculated to predict next location information.

In addition, distance information between the vehicle and the object may be calculated based on the detection information obtained by the object detection part 100.

Tracking a movement of an object by analyzing image data including movement information and predicting a subsequent movement of the object are well-known technology and thus the present invention is not limited thereto.

It is preferable that the lamp driving controller 400 includes technical features to be described below, as well as the technical features described above.

Specifically, the lamp driving controller 400 may supply an operating current to an infrared light source matching the current location information and an infrared light source matching the predicted next location information, based on the information analyzed by the object analysis part 300.

That is, the lamp driving controller 400 extracts an infrared light source matching the current location information from among the infrared light sources of the lamp array part 200 on the basis of the information analyzed by the object analysis part 300, and supplies the operating current to the extracted infrared light source.

In addition, the lamp driving controller 400 extracts an infrared light source matching the next location information from among the infrared light sources of the lamp array part 200 on the basis of the information analyzed by the object analysis part 300, and supplies the operating current to the extracted infrared light source.

Accordingly, the object can be checked through the display part of the vehicle by radiating light from the infrared light source earlier than a movement of the object, thereby preventing a collision accident in advance.

In this case, the lamp driving controller 400 supplies the operating current to only the infrared light sources matching the current location information and the next location information, i.e., selectively turns on these infrared light sources, to effectively secure visibility with allowable power consumption.

Specifically, the lamp driving controller 400 may supply a current, which is in a predetermined allowable current range, as an operating current to the infrared light source matching the current location information, and supply a current, which is less than or equal to the operating current supplied to the infrared light source matching the current location information, as an operating current to the infrared light source matching the next location information.

That is, in order to efficiently reduce power consumption using the night vision function which is an additional function, a current, which is in a current range predetermined based on an allowable current (power consumption) (a range of current consumption through the night vision function), is supplied as an operating current to the infrared light source matching the current location information, and an operating current is preemptively supplied to the infrared light source matching the next location information to control these infrared light sources to be turned on.

However, by controlling brightness, a situation in front of a vehicle due to a movement of an object can be notified to a driver of the vehicle while efficiently reducing power consumption. Here, the brightness is the brightness of the infrared light source, and thus, does not correspond to the field of view of the driver, and detection information is converted into image data and the image data is transmitted to the driver.

Furthermore, the lamp driving controller 400 may maintain the supply of the operating current for a predetermined time after the operating current is supplied to the infrared light sources matching the current location information and the next location information.

Thus, even when an infrared light source turned on according to immediately previous information (analyzed information) and an infrared light source turned on according to current information (analyzed information) are different from each other, the turned-on states of the infrared light sources are maintained for a certain time, thereby greatly securing driving stability.

Accordingly, the night vision function is designed to improve the driving stability of a driver during driving at night and thus a surrounding situation of the vehicle is continuously notified to the driver.

In addition, according to a state of the vehicle, when the amount of power to be consumed by the lamp driving controller 400 within an allowable power consumption is sufficient, i.e., when spare power to be consumed is sufficient, a lowest operating current may be supplied to all of the infrared light sources of the lamp array part 200 to maintain turned-on states of the infrared light sources. When analysis information of current location information and next location information is transmitted, operating currents for infrared light sources matching the current location information and the next location information may be controlled to appropriately adjust the turned-on states/brightness.

Figure 7A:
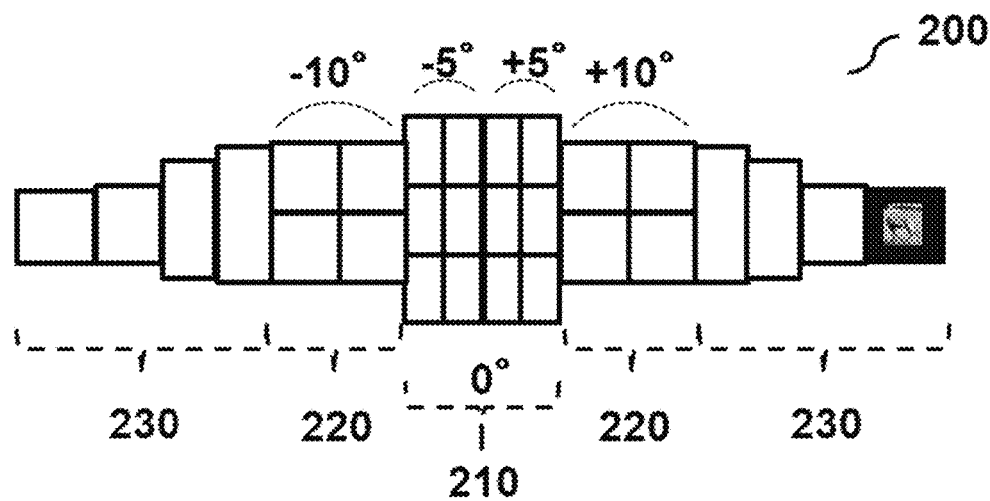
FIGS. 7A to 7C and 8A to 8C are diagrams illustrating states in which a plurality of infrared light sources are individually controlled in an intelligent night vision system and a driving method thereof according to an embodiment of the present invention.
Figure 7B:
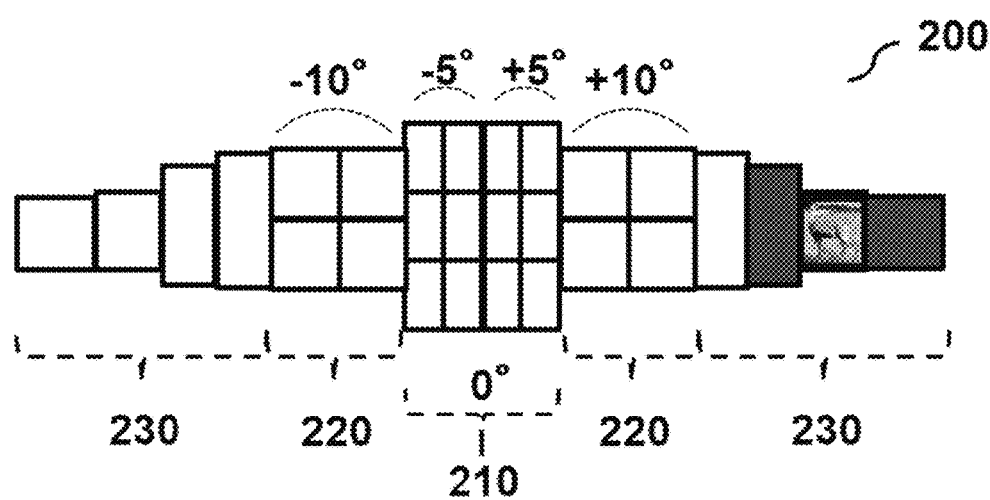
Figure 7C:
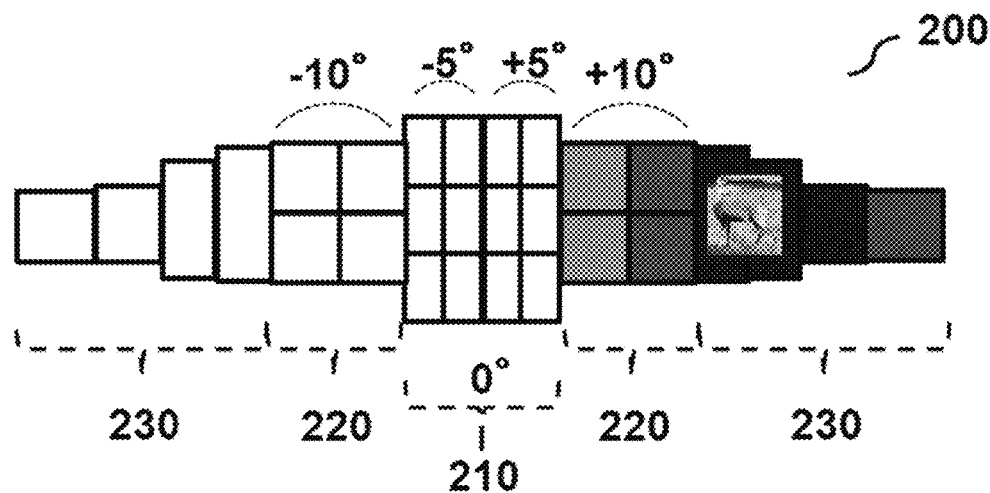
Figure 8A:
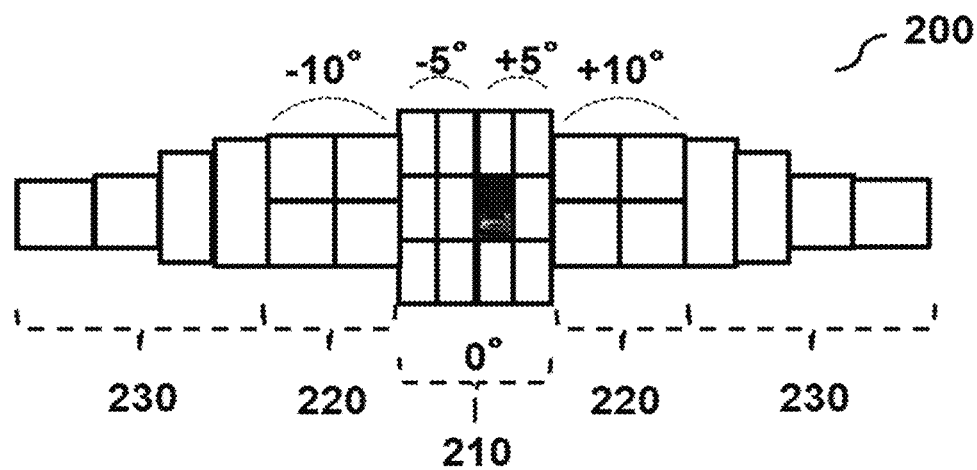
Figure 8B:
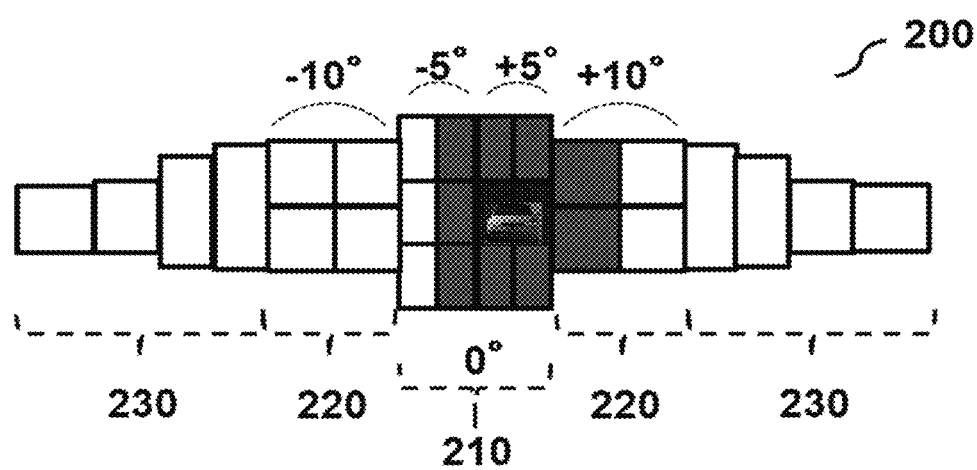
Figure 8C:
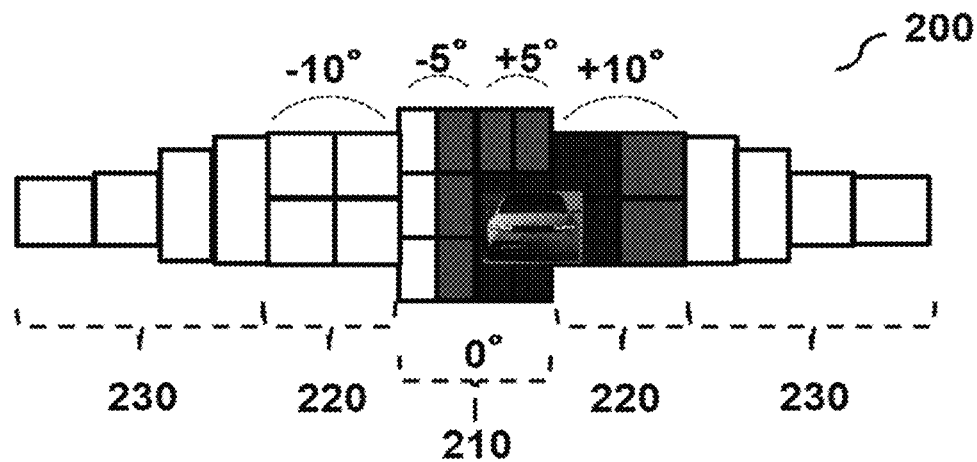

FIGS. 7A to 7C are diagrams illustrating a turned-on state of an infrared light source according to an operation of the lamp driving controller 400 when a detected object is an animal. FIGS. 8A to 8C are diagrams illustrating a turned-on state of the infrared light source according to an operation of the lamp driving controller 400 when a detected object is a vehicle.

In detail, FIGS. 7A to 7C illustrate a case in which a detected object is an animal, and the object initially appeared in an outer angle region (10 degrees or more) and moved to a region close to the center in a horizontal direction.

Accordingly, as shown in FIGS. 7A to 7C illustrating a time series flow, an area in which an object that initially appears is detected is analyzed on the basis of current location information, and an infrared light source matching the current location information is controlled to be turned on. Sequentially, next location information is predicted prior to an actual movement of the object, and an infrared light source matching the next location information is controlled to be turned on.

In this case, as described above, on/off control may be performed by turning on/off an infrared light source, or brightness may be controlled by controlling an operating current.

FIGS. 8A to 8C illustrate a case in which a detected object is a vehicle, and detection is initially performed in a small region of an area (10 degrees or less) close to the center in a horizontal direction, and is gradually performed while increasing a detection area in the horizontal direction although an amount of movement is small.

Accordingly, as shown in FIGS. 8A to 8C illustrating a time series flow, an area in which an object that initially appears is detected is analyzed on the basis of current location information, and an infrared light source matching the current location information is controlled to be turned on. Sequentially, next location information is predicted prior to an actual movement of the object, and an infrared light source matching the next location information is controlled to be turned on.

In this case, as described above, on/off control may be performed by turning on/off an infrared light source or brightness may be controlled by controlling an operating current.

Figure 9:
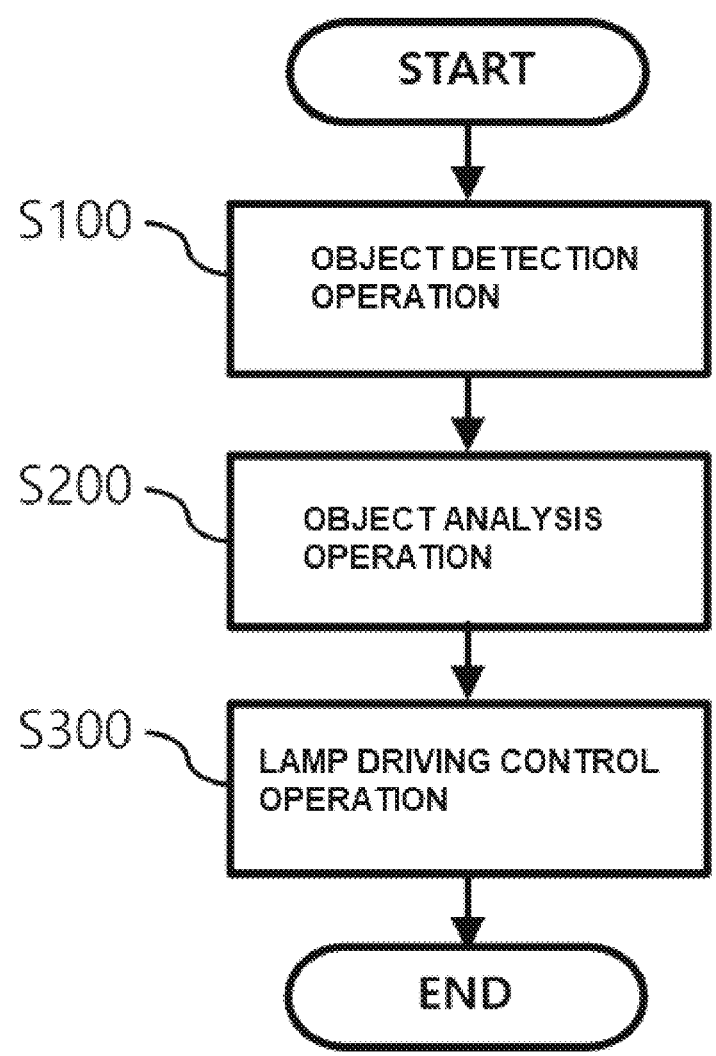
FIG. 9 is a flowchart of a driving method of an intelligent night vision system according to an embodiment of the present invention.

A driving method of an intelligent night vision system according to an embodiment of the present invention includes an object detection operation S100, an object analysis operation S200, and a lamp driving control operation S300 as shown in FIG. 9. These operations may be performed by an operation processing unit of an intelligent night vision system.

These operations will be described in detail below.

In the object detection operation S100, the object detection part 100 detects an object (e.g., a vehicle, an animal, or a human) in front of a vehicle that is being driven.

To this end, the object is detected by sensing light returned after being reflected from the object, which is within a detection distance, through a sensor (a camera or the like) mounted on the front of the vehicle and capable of detecting an infrared wavelength range, when light is radiated forward.

Detecting an object in front of a vehicle by a sensor capable of detecting an infrared wavelength range as described above is well-known technology and thus a detailed description thereof is omitted here.

However, in the object detection operation S100, the object in front of the vehicle that is driving is continuously detected at predetermined time intervals to continuously provide detection information sufficient to estimate a movement of the object.

In the object analysis operation S200, the object analysis part 300 analyzes information about a movement of the detected object on the basis of the detection information provided in the object detection operation S100.

Specifically, in the object analysis operation S200, which is a first night vision function, the detection information provided in the object detection operation S100 is converted into image data, and the image data is displayed on a display part of the vehicle to notify a driver about a situation in front of the vehicle during driving at night.

At the same time, a movement of the detected object is tracked on the basis of image data that is continuously converted in a time-series order, and not only current location information of the detected object but also a moving direction and speed of the object are calculated to predict next location information.

In addition, distance information between the vehicle and the object may be also calculated on the basis of the detection information.

Tracking a movement of an object by analyzing image data including movement information and predicting a subsequent movement of the object are well-known technology and thus the present invention is not limited thereto.

In the lamp driving control operation S300, the lamp driving controller 400 controls a driving state of the lamp array part 200, including the plurality of infrared light sources arranged in the matrix to form the beam pattern, using the information analyzed in the object analysis operation S200.

In this case, the lamp array part 200 may be configured to form a beam pattern by arranging a plurality of infrared light sources (infrared LEDs or the like) in a matrix, and be mounted on the front of the vehicle to radiate infrared rays ahead of the vehicle.

Specifically, as shown in FIG. 6, the plurality of infrared light sources of the lamp array part 200 may be arranged in an a-region 210, a b-region 220, and a c-region 230 divided in the horizontal direction from an area in front of the vehicle that affects the driving of the vehicle.

Infrared light sources arranged in predetermined regions to the left and right of a central infrared light source arranged at the center in the horizontal direction may be included in the a-region 210, and infrared light sources arranged in predetermined regions corresponding to a left end and a right end of the a-region 210 may be included in the b-region 220.

Infrared light sources arranged in predetermined regions corresponding to a left end and a right end of the b-region 220 may be included in the c-region 230.

Here, the predetermined regions may be set by dividing a width of a front area, which affects the vehicle and may vary according to the type of the vehicle, into several parts in the horizontal direction, and preferably, by dividing a width of about 20 m, which is sufficient to cover six lanes, into several parts in the horizontal direction, but the width of the front area is not limited to 20 m.

A result of limiting objects that are highly likely to appear on the road on which the vehicle is driving to vehicles, animals, and humans, and analyzing statistics of movement patterns thereof through an experiment showed that animals or humans were found initially an outer region of the road (10 degrees or more) and moved inward in the horizontal direction.

In addition, it can be seen that vehicles were initially found in a small detection region of an area close to the center of the road (10 degrees or less), a rate of change in a horizontal angle was low (close to 0 degrees), but a rate of change in a vertical angle increased sharply, i.e., the detection region increased sharply.

In addition, it can be seen that a maximum height at objects appeared was 2 m, and thus, it is desirable to set a vertical angle at the center of an effective field of view (FOV) of the lamp array part 200 to −7 to +10 degrees and a horizontal angle at the center of the FOV to about −25 to +25 degrees.

That is, as shown in FIG. 6, it is desirable to arrange infrared light sources such that a directional angle of a central infrared light source matches 0 degrees, and absolute values of directional angles of the other infrared light sources increase in directions toward outermost angles in the horizontal direction.

Accordingly, an outer region of the lamp array part 200 need not be divided into segments, because a risk of collision with a host vehicle may occur when the host vehicle moves inward in the horizontal direction, whereas a central region of the lamp array part 200 needs to be divided into segments, because a risk of collision of a region adjacent to the central region is high and a small initial detection region increases sharply.

In consideration of this point, it is desirable to arrange the lamp array part 200 such that a density of the infrared light sources included in the a-region 210 is higher than that of the infrared light sources included in the b-region 220 as shown in FIG. 6.

In addition, it is desirable to arrange the lamp array part 200 such that a density of the infrared light sources included in the b-region 220 is higher than that of the infrared light sources included in the c-region 230.

In this case, in the lamp array part 200, the infrared light sources are not simply densely arranged, but the infrared light sources included in the a-region 210 may form at least n layers (rows), the infrared light sources included in the b-region 220 may form at least n layers (rows), and the infrared light sources included in the c-region 230 may form at least o layers (rows).

Here, preferably, n>m>o, and o>=1.

Accordingly, a risk of collision in the c-region 230, which is an outer angle region (10 degrees or more) in which generally, animals or humans appear, is less than that in a region adjacent to the center (10 degrees or less), and thus, the c-region 230 may be divided into a relatively small number of segments to form one row.

However, in the a-region 210 and the b-region 220, which are adjacent to the center and in which generally, vehicles appear, the size of a detection area is small when an object is initially detected and increases sharply as time goes by, and thus, regions adjacent to the center may be divided into a relatively large number of segments to form multiple rows.

In consideration of this point, in the lamp driving control operation S300, an infrared light source matching current location information may be extracted from among the infrared light sources of the lamp array part 200 on the basis of the information analyzed in the object analysis operation S200, and operating current is supplied to the extracted infrared light source.

In addition, an infrared light source matching next location information is extracted from among the infrared light sources of the lamp array part 200, and operating current is supplied to the extracted infrared light source.

Accordingly, the object can be checked through the display part of the vehicle by radiating light from the infrared light source earlier than a movement of the object, thereby preventing a collision accident in advance.

In addition, in order to effectively secure visibility with allowable power consumption, the operating current is supplied to only the infrared light sources matching the current location information and the next location information, in other words, selective lighting is performed.

Specifically, in the lamp driving control operation S300, a current that is in a predetermined allowable current range is supplied to the infrared light source matching the current location information, and a current less than or equal to the operating current supplied to the infrared light source matching the current location information is supplied to the infrared light source matching the next location information.

That is, in order to efficiently reduce power consumption using the night vision function which is an additional function, an irradiation state may be controlled by supplying a current, which is in a current range predetermined based on an allowable current (power consumption) (a range of current consumption through the night vision function), as an operating current to the infrared light source matching the current location information, and preemptively supplying an operating current to the infrared light source matching the next location information.

However, by controlling brightness, a situation in front of a vehicle due to a movement of an object can be notified to a driver of the vehicle while efficiently reducing power consumption. Here, the brightness is the brightness of the infrared light source and thus does not correspond to the field of view of the driver, and detection information is converted into image data and the image data is transmitted to the driver.

Furthermore, in the lamp driving control operation S300, the supply of the operating current is maintained for a predetermined time after the operating current is supplied to the infrared light sources matching the current location information and the next location information.

Thus, even when an infrared light source turned on according to immediately previous information (analyzed information) and an infrared light source turned on according to current information (analyzed information) are different from each other, the turned-on states of the infrared light sources are maintained for a certain time, thereby greatly securing driving stability.

Accordingly, the night vision function is designed to improve the driving stability of a driver during driving at night and thus a surrounding situation of the vehicle is continuously notified to the driver.

In addition, in the lamp driving control operation S300, according to a state of the vehicle, when the amount of power to be consumed through the lamp array part 200 within an allowable power consumption is sufficient, i.e., when spare power to be consumed is sufficient, a lowest operating current may be supplied to all of the infrared light sources of the lamp array part 200 to maintain turned-on states of the infrared light sources. When analysis information of current location information and next location information is transmitted, operating currents for infrared light sources matching the current location information and the next location information may be controlled to appropriately adjust the turned-on states/brightness.

According to an intelligent night vision system and a driving method thereof according to the present invention, night visibility can be secured by changing a luminous intensity according to a visible distance and a directional angle and controlling turning on or off of each light source in association with driving information including at least one of the speed of a vehicle, a road condition, or a driving situation.

In addition, it is possible to supplement disadvantages of an ADB headlamp and the night vision function, and prevent the occurrence of accidents and secure visibility, thereby improving driving safety of a driver.

That is, an object (a vehicle, an animal or a human) appearing in front of a vehicle can be detected through an infrared sensor (a camera or the like), and an infrared light source (an infrared LED or the like) corresponding to an area of the detected object can be selectively turned on. Thus, even when a dark zone is formed on an object detection area, an infrared ray can be radiated to the dark zone to secure a driver's visibility for an entire area in front of the vehicle without a blank area.

In this case, in order to solve a problem with power consumption, which is a disadvantage of the night vision function, only the infrared light source corresponding to the area of the detected object can be selectively turned on when spare power cannot be operated on the basis of allowable power consumption, and not only the infrared light source corresponding to the area of the detected object but also infrared light sources corresponding to an surrounding area can be turned on for safety when the spare power can be operated.

In addition, by using information about a distance to the detected object, a current can be converted such that light is radiated at an appropriate luminous intensity, thereby compensating for the problem with power consumption, which is the disadvantage of the night vision function.

While the embodiments of the present invention have been described above, the embodiments set forth herein are not intended to limit the technical idea of the present invention but are for the purpose of illustration. Therefore, it should be understood that the technical idea of the present invention includes not only the embodiments set forth herein but also a combination thereof, and the technical scope of the present invention is not limited by the embodiments. In addition, it should be understood that various modifications and changes may be made in the present invention by those of ordinary skill in the art without departing from the spirit and scope of the appended claims, and all such appropriate modifications and changes are equivalents that are within the scope of the present invention.

What is claimed is:

1. An intelligent night vision system for a vehicle, comprising:
    a lamp array part comprising a plurality of light sources provided independently from each other; and
    a lamp driving controller configured to control the lamp array part based on driving information of the vehicle,
    wherein the plurality of light sources radiate light of an infrared wavelength range, and the lamp driving controller controls luminous intensities and irradiation ranges of the plurality of light sources, based on the driving information, and controls an entire beam pattern, which is a combination of light radiated from the lamp array part, to be symmetrical with respect to a center of the entire beam pattern,
    wherein the areas where light is radiated from the lamp array part are divided into a first area, which includes a certain angle range with respect to a centerline in the horizontal direction, and a second area, which excludes the first area, and
    the lamp driving controller controls the irradiation angle so that the vertical directional angle corresponding to the lower boundary starting point of the second area, with respect to the centerline of the horizontal axis, is less than or equal to a certain angle, which is greater than the lower boundary angle of the first area's vertical directional angle.

2. The intelligent night vision system of claim 1, wherein the lamp driving controller is configured to:
    control the lamp array part to radiate light to a first area at a vertical directional angle ranging from a 1-1 angle of −8 degrees to a 1-2 angle of +10 degrees, the first area being included in a certain angle range with respect to a centerline in a horizontal direction among areas to which light is radiated from the lamp array part; and
    control the lamp array part to radiate light to a second area at a vertical directional angle less than or equal to a second angle, the second area being a remaining area excluding the first area among the areas to which light is radiated from the lamp array part,
    wherein the second angle is greater than the 1-1 angle and less than the 1-2 angle.

3. The intelligent night vision system of claim 1, wherein the lamp driving controller is configured to:
    control the lamp array part to radiate light to a first area at a vertical directional angle ranging from a 1-1 of −8 degrees angle to a 1-2 angle of +10 degrees, the first area being included in a certain angle range with respect to a centerline in a horizontal direction among areas to which light is radiated from the lamp array part; and
    control the lamp array part to radiate light to a 2-1 region at a vertical directional angle less than or equal to a second angle of −4 degrees and radiate light to a 2-2 region at a vertical directional angle less than or equal to the 1-2 angle of +10 degrees, the 2-1 region being a low end region of another area, excluding the first area, with respect to a centerline in a horizontal direction among the areas to which light is radiated from the lamp array part, and the 2-2 region being an upper end region of the another area.

4. The intelligent night vision system of claim 1, wherein the lamp driving controller is configured to obtain a sensing distance from the driving information, and control the luminous intensity to be equal to a multiple of a square of the sensing distance.

5. The intelligent night vision system of claim 1, wherein the lamp driving controller is configured to control two or more light sources among the plurality of light sources to be turned on or off, wherein units controlled to be turned on or off are a same as units of areas to which light is radiated forward.

6. The intelligent night vision system of claim 1, wherein the lamp driving controller is configured to obtain information about a speed of the vehicle from the driving information, and control the lamp array part to maintain or reduce the number of light sources to be turned on or off as the speed of the vehicle increases and to first turn off a light source radiating light to an outermost side in horizontal direction.

7. The intelligent night vision system of claim 1, wherein the lamp driving controller is configured to control an optical module to increase luminous intensity of a light source radiating light toward a center in a horizontal direction among the plurality of light sources.

* * * * *